United States Patent
Chao et al.

(10) Patent No.: US 8,305,118 B2
(45) Date of Patent: Nov. 6, 2012

(54) POWER SUPPLY SYSTEM

(75) Inventors: Hong-Wen Chao, New Taipei (TW);
San-Yuan Chuang, New Taipei (TW);
Mao-Shun Hsi, New Taipei (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 0 days.

(21) Appl. No.: 13/095,860

(22) Filed: Apr. 28, 2011

(65) Prior Publication Data

US 2012/0086481 A1    Apr. 12, 2012

(30) Foreign Application Priority Data

Oct. 6, 2010    (TW) .................................. 99133954

(51) Int. Cl.
*H03L 7/00* (2006.01)

(52) U.S. Cl. ........................................................ 327/143

(58) Field of Classification Search ........................ None
See application file for complete search history.

(56) References Cited

U.S. PATENT DOCUMENTS 5,357,222 A * 10/1994 Hietala ........................ 332/124
* cited by examiner

*Primary Examiner* — Lincoln Donovan
*Assistant Examiner* — Sibin Chen
(74) *Attorney, Agent, or Firm* — Altis Law Group, Inc.

(57) ABSTRACT

A power supply system, for discharging a resume and reset (RSMRST) signal during the RSMRST signal pull down, includes a voltage regulating circuit, a delay circuit, a switch circuit, and a discharge circuit. The voltage regulating circuit receives a first voltage signal and converts the first voltage signal to a second voltage signal. The delay circuit is charged by the second voltage signal and outputs the second voltage signal once fully charged. The switch circuit receives the second voltage signal and then outputs a RSMRST signal. The discharge circuit discharges the delay circuit. The delay circuit is charged during a first state and discharged during a second state.

13 Claims, 2 Drawing Sheets

POWER SUPPLY SYSTEM

BACKGROUND

1. Technical Field

The disclosure generally relates to a power supply system, and especially to a power supply system for stabilizing time sequence of a resume and reset (RSMRST) signal in computer systems.

2. Description of Related Art

When a computer system is awakened from an Advanced Configuration and Power Interface (ACPI) sleep state S4, components on a motherboard of the computer system are powered up. During the power up sequence of the motherboard, there is a plurality of signals (e.g., RSMRST signal, +3.3V_AUX voltage signal) in the computer system that should meet a required signal timing sequence. The RSMRST signal is generated from a south bridge chip and sent to a Super I/O chip of the computer system. The +3.3V_AUX voltage signal is generated from a DC power supply and sent to graphics acceleration cards, net cards and other cards on the motherboard. According to the required signal timing sequence, the +3.3V_AUX voltage signal should be pulled down later than the RSMRST signal with a delay time. If the +3.3V_AUX voltage signal is pulled down earlier than the RSMRST signal, a power up failure will occur, and the computer system cannot return to state S0, the operating state, from the sleep state S4.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
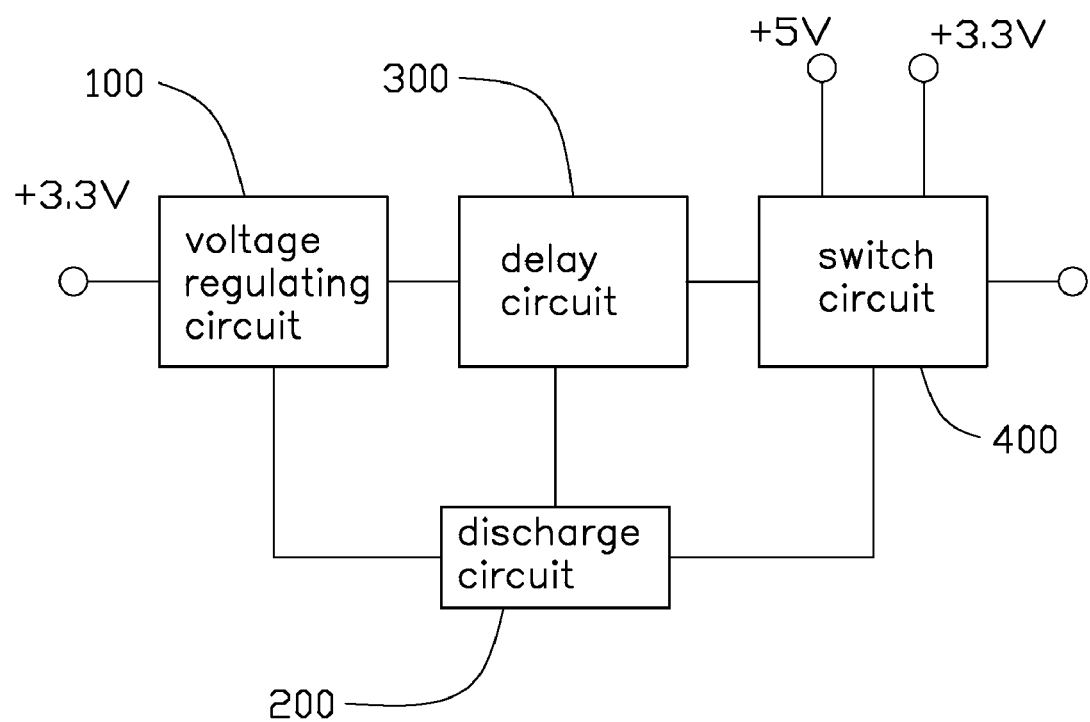
FIG. 1 is a block diagram of an embodiment of a power supply system.

Referring to FIG. 1, an embodiment of a power supply system, for discharging a resume and reset (RSMRST) signal during the RSMRST signal pull down, includes a voltage regulating circuit 100, a discharge circuit 200, a delay circuit 300, and a switch circuit 400. The voltage regulating circuit 100 is configured to receive a first voltage signal, and convert the first voltage signal to a second voltage signal. The delay circuit 300 is configured to be charged by the second voltage signal, and output the second voltage signal once fully charged. The switch circuit 400 is configured to receive the second voltage signal, and output the RSMRST signal according to the second voltage signal. The discharge circuit 200 is configured to discharge the delay circuit 300 during the first voltage signal pull down from a high level voltage to a low level voltage.

Figure 2:
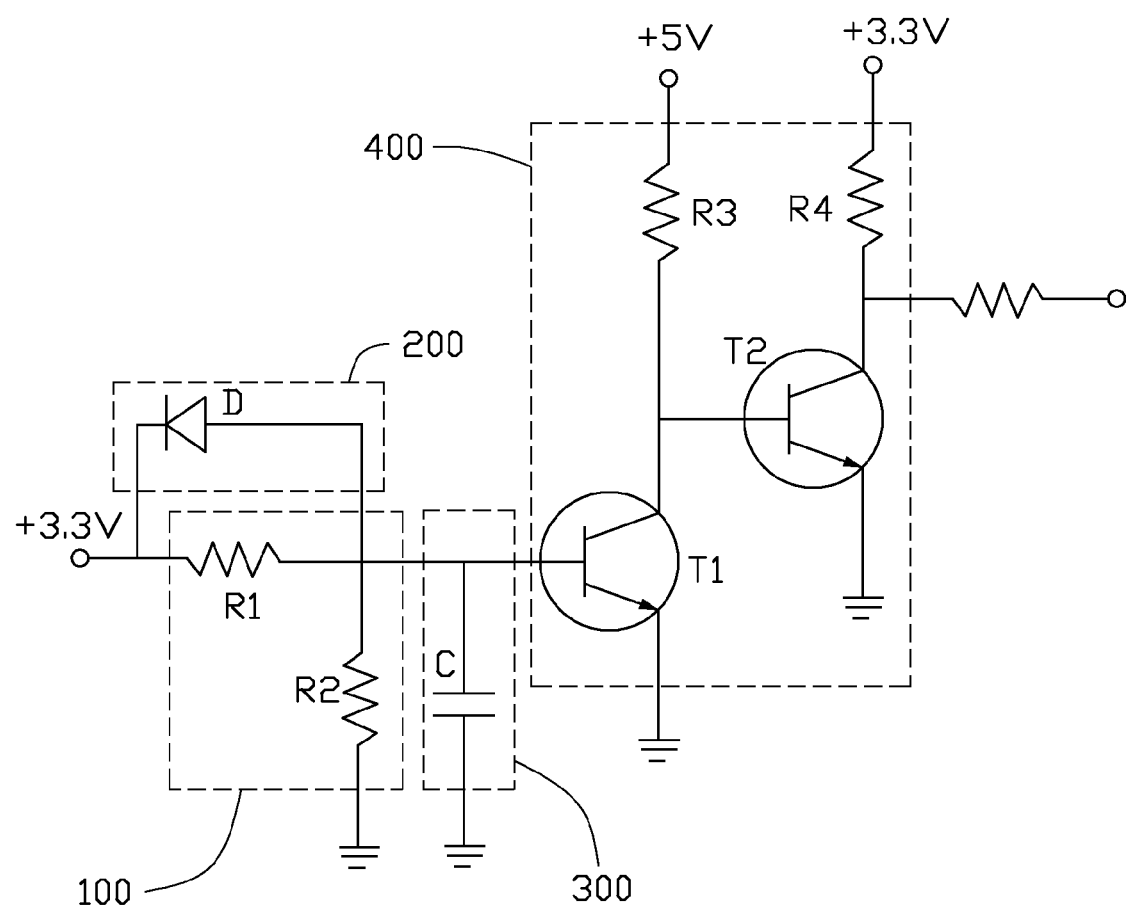
FIG. 2 is a circuit view of the power supply system of FIG. 1.

Referring to FIG. 2, the voltage regulating circuit 100 includes a first resistor R1 and a second resistor R2. The first resistor R1 and the second resistor R2 are electrically connected in series between the first voltage signal and ground. A connection point between the first resistor R1 and the second resistor R2 is configured to output the second voltage signal. The discharge circuit 200 includes a diode D. An anode of the diode D is electrically connected to the connection point between the first resistor R1 and the second resistor R2. A cathode of the diode D is configured to receive the first voltage signal. The delay circuit 300 includes a capacitor C. The connection point between the first resistor R1 and the second resistor R2 is grounded via the capacitor C.

The switch circuit 400 includes a first switch T1, a second switch T2, a third resistor R3, and a fourth resistor R4. The first switch T1 includes a first switch first terminal, a first switch second terminal, and a first switch third terminal. The second switch T2 includes a second switch first terminal, a second switch second terminal, and a second switch third terminal. The first switch first terminal is configured to receive the second voltage signal. The first switch second terminal is grounded. The first switch third terminal is electrically connected to the second switch first terminal. The first switch third terminal is configured to receive a third voltage signal via the third resistor R3. The second switch second terminal is grounded. The second switch third terminal is configured to output the RSMRST signal. The second switch third terminal is configured to receive the first voltage signal via the fourth resistor R4. In one embodiment, the first and second switches T1, T2 are NPN type transistors. The first terminal is a base. The second terminal is an emitter. The third terminal is a collector. The first voltage signal is a +3.3V_AUX voltage signal. The second voltage signal is a +5V_AUX voltage signal.

When the voltage regulating circuit 100 receives a high level voltage first voltage signal, the high level voltage first voltage signal is converted to a high level voltage second voltage signal. The capacitor C of the delay circuit 300 is charged by the high level voltage second voltage signal until the first switch T1 turns on. The second switch first terminal receives a low level voltage from ground. The second switch T2 turns off. The second switch third terminal outputs a high level voltage RSMRST signal.

When the voltage regulating circuit 100 receives a low level voltage first voltage signal, the fully charged capacitor C is discharged by the diode D. The first switch first terminal is pulled down to a low level voltage and turns off. The second switch first terminal receives a high level voltage +5V_AUX voltage signal and turns on. The second switch third terminal outputs a low level voltage RSMRST signal. During the first voltage signal pull down, the fully charged capacitor C is discharged rapidly by the diode D. The RSMRST signal is pulled down to a low level voltage earlier than the first voltage signal. Therefore, a stability of the RSMRST signal time sequence is ensured.

When an oscillograph was used to measure the time sequence of the first voltage signal and the RSMRST signal, the results of an embodiment showed that the RSMRST signal was pulled down to 0.8 volts 480 microseconds earlier than the first voltage signal was pulled down to 2.1 volts when using the discharge circuit of the disclosure. The RSMRST signal was pulled down to 0.8 volts 560 microsecond later than the first voltage signal was pulled down to 2.1 volts when the discharge circuit was not used.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply system, for discharging a resume and reset (RSMRST) signal during the RSMRST signal pull down, comprising:
a voltage regulating circuit configured to receive a first voltage signal and convert the first voltage signal to a second voltage signal;
a delay circuit configured to be charged by the second voltage signal and output the second voltage signal once fully charged;
a switch circuit configured to receive the second voltage signal and output the RSMRST signal according to the second voltage signal; and
a discharge circuit configured to discharge the delay circuit; wherein the delay circuit is charged during a first state and discharged during a second state; in the first state, the delay circuit is charged by the second voltage signal; in the second state, the delay circuit is discharged by the discharge circuit, the first voltage signal is pulled down from a high level voltage to a low level voltage and the RSMRST signal is pulled down to a low level voltage earlier than the first voltage signal; wherein the switch circuit comprises a first switch, a second switch, a third resistor, and a fourth resistor; the first switch comprises a first switch first terminal, a first switch second terminal, and a first switch third terminal; the second switch comprises a second switch first terminal, a second switch second terminal, and a second switch third terminal; the first switch first terminal is configured to receive the second voltage signal; the first switch second terminal is grounded; the first switch third terminal is electrically connected to the second switch first terminal; the first switch third terminal is configured to receive a third voltage signal via the third resistor; the second switch second terminal is grounded; the second switch third terminal is configured to output the RSMRST signal; and the second switch third terminal is configured to receive the first voltage signal via the fourth resistor.

2. The power supply system of claim 1, wherein the voltage regulating circuit comprises a first resistor and a second resistor; the first resistor and the second resistor are electrically connected in series between the first voltage signal and ground; a connection point between the first resistor and the second resistor is configured to output the second voltage signal.

3. The power supply system of claim 2, wherein the delay circuit comprises a capacitor; the connection point between the first resistor and the second resistor is grounded via the capacitor.

4. The power supply system of claim 1, wherein the first switch and the second switch are NPN type transistors; the first switch first terminal is a base; the first switch second terminal is an emitter; the first switch third terminal is a collector; the second switch first terminal is a base; the second switch second terminal is an emitter; and the second switch third terminal is a collector.

5. The power supply system of claim 2, wherein the discharge circuit comprises a diode; an anode of the diode is electrically connected to the connection point between the first resistor and the second resistor; and a cathode of the diode is configured to receive the first voltage signal.

6. The power supply system of claim 1, wherein when the voltage regulating circuit receives a high level voltage first voltage signal, the second switch third terminal outputs a high level voltage RSMRST signal.

7. The power supply system of claim 1, wherein when the voltage regulating circuit receives a low level voltage first voltage signal, the second switch third terminal outputs a low level voltage RSMRST signal.

8. A power supply system, for discharging a resume and reset (RSMRST) signal during the RSMRST signal pull down, comprising:
a voltage regulating circuit configured to receive a first voltage signal and convert the first voltage signal to a second voltage signal;
a delay circuit configured to be charged by the second voltage signal and output the second voltage signal once fully charged;
a switch circuit configured to receive the second voltage signal and output the RSMRST signal according to the second voltage signal; wherein the switch circuit comprises a first switch and a second switch; and
a discharge circuit configured to discharge the delay circuit; wherein the delay circuit is configured to be charged during a first state and discharged during a second state; in the first state, the delay circuit is charged by the second voltage signal and the second switch is configured to output a high level voltage RSMRST signal; in the second state, the delay circuit is discharged by the discharge circuit and the second switch is configured to output a low level voltage RSMRST signal, the first voltage signal is pulled down from a high level voltage to a low level voltage and the RSMRST signal is pulled down to a low level voltage earlier than the first voltage signal.

9. The power supply system of claim 8, wherein the voltage regulating circuit comprises a first resistor and a second resistor; the first resistor and the second resistor are electrically connected in series between the first voltage signal and ground; a connection point between the first resistor and the second resistor is configured to output the second voltage signal.

10. The power supply system of claim 9, wherein the delay circuit comprises a capacitor; the connection point between the first resistor and the second resistor is grounded via the capacitor.

11. The power supply system of claim 10, wherein the switch circuit further comprises a third resistor and a fourth resistor; the first switch comprises s a first switch first terminal, a first switch second terminal, and a first switch third terminal; the second switch comprises s a second switch first terminal, a second switch second terminal, and a second switch third terminal; the first switch first terminal is configured to receive the second voltage signal; the first switch second terminal is grounded; the first switch third terminal is electrically connected to the second switch first terminal; the first switch third terminal is configured to receive a third voltage signal via the third resistor; the second switch second terminal is grounded; the second switch third terminal is configured to output the RSMRST signal; and the second switch third terminal is configured to receive the first voltage signal via the fourth resistor.

12. The power supply system of claim 11, wherein the first switch and the second switch are NPN type transistors; the first switch first terminal is a base; the first switch second terminal is an emitter; the first switch third terminal is a collector; the second switch first terminal is a base; the second switch second terminal is an emitter; and the second switch third terminal is a collector.

13. The power supply system of claim 9, wherein the discharge circuit comprises a diode; an anode of the diode is electrically connected to the connection point between the first resistor and the second resistor; a cathode of the diode is configured to receive the first voltage signal.

* * * * *